Charles S. Allen
INVENTOR.

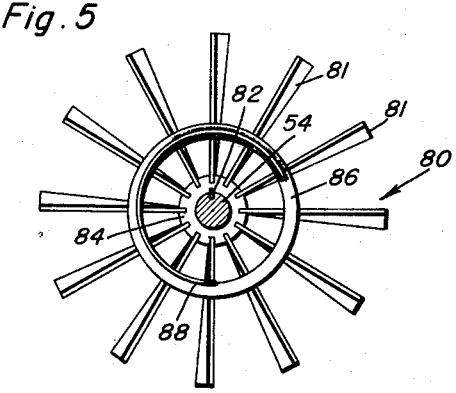
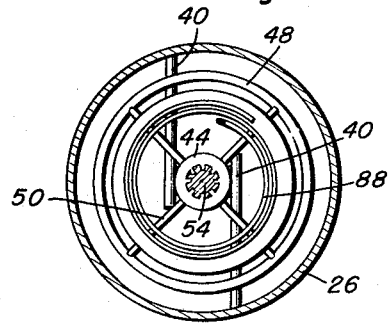
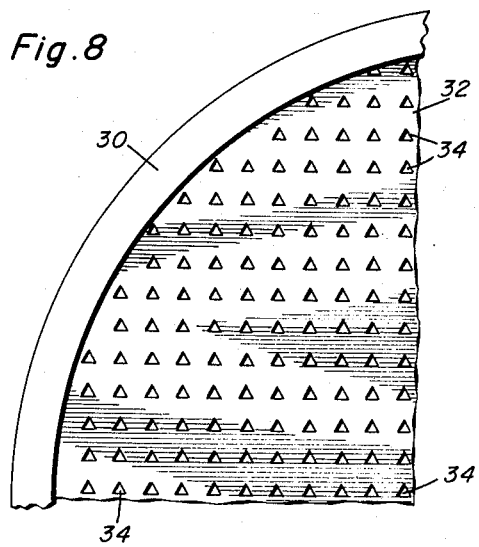
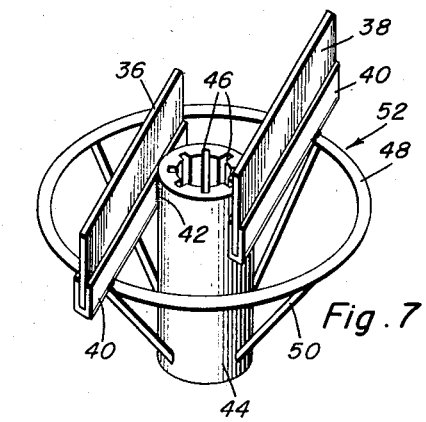
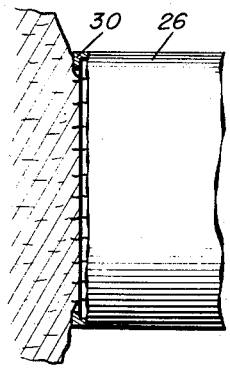
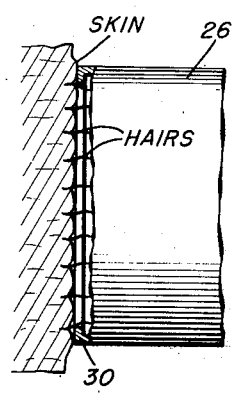
Charles S. Allen
INVENTOR.

_United States Patent Office_ 2,802,260
Patented Aug. 13, 1957

2,802,260

DRY SHAVER WITH ROTARY CUTTING BLADES AND SUCTION FAN

Charles S. Allen, Bakersfield, Calif.

Application December 30, 1955, Serial No. 556,543

2 Claims. (Cl. 30—41.5)

This invention relates to certain new and useful improvements in a dry-shaver-type electric razor which in over-all appearance resembles electric razors which are revealed in analogous prior patents and are currently on the market in that it is characterized, generally speaking, by an encased small electric motor wherein the case constitutes a handle.

More specifically, the invention pertains to an electric motor case or casing the forward or leading end of which is gradually reduced in cross-section where it terminates in an annular neck. A flanged collar is fastened to the neck and extends axially beyond the neck, said collar constituting a cap in which the shear plate or disk is mounted. In this connection, it is to be pointed out that one object of the instant invention is to provide a relatively small cap and complemental shear plate which is flat-faced and is discoidal, being approximately a one-inch skin contacting and hair shearing surface.

Experimentation has shown that even the apertures or holes in the shear disk are significantly important. Therefore, it is an object of the instant invention to utilize holes or apertures which are triangular in shape. These cooperate in insuring highly efficient handling and severance of the facial hairs or whiskers.

Another object of the invention has to do with a motor driven shaft which is so constructed and arranged that the end adjacent to said shear plate is provided with a cutter head. The latter is in the nature of a so-called spider and includes a braced ring, said ring supporting a hub-forming sleeve and the sleeve and ring supporting channel-shaped holders for a pair of spaced parallel substantially coplanar self-sharpening blades which have wiping contact with the interior surface of the shear plate.

A further object of the invention is to impose concentrated suction on the portions of the skin from which the hairs grow, that is the small cup-like portions of the skin, whereby to cause the same to flatten out and tauten and to present the hairs to the cutting blades by way of the triangular holes in the shear plate for keen and clean slicing. To this end, it is therefore an object of the invention to provide the motor shaft with a suitably bladed fan which produces the desired suction result.

Then, too, novelty is predicated on a partition arrangement in the case which separates the bladed fan from the spring pressed cutter head and the partition being formed with a radial funnel which traps the loose hairs and delivers the same into a detachable replaceable bag, for example, a throw-away paper sack of proper construction. In connection with this aspect of the invention a suitable slotted ventilating cover is hingedly mounted on the bottom of the case and constitutes a receiver and holder for the stated bag.

Other objects, features and advantages will become more readily apparent from the following description and the accompanying sheets of drawings.

In the drawings:

Figure 5 is an exaggerated section on the line 5—5 of Figure 1 looking in the direction of the arrows and with parts of the casing omitted;

Figure 6 is an enlarged section on the line 6—6 of Figure 1;

Figure 7 is a perspective view of the blade-equipped cutter head;

Figure 8 is an exaggerated fragmentary end elevation illustrating the shape of the holes in the shear plate; and, Figures 9 and 10 are diagrammatic views showing how the induced suction functions to flatten the surface of the skin and to draw the individual hairs into and through the holes in the shear plate.

Figures 1, 2, 3, 4:
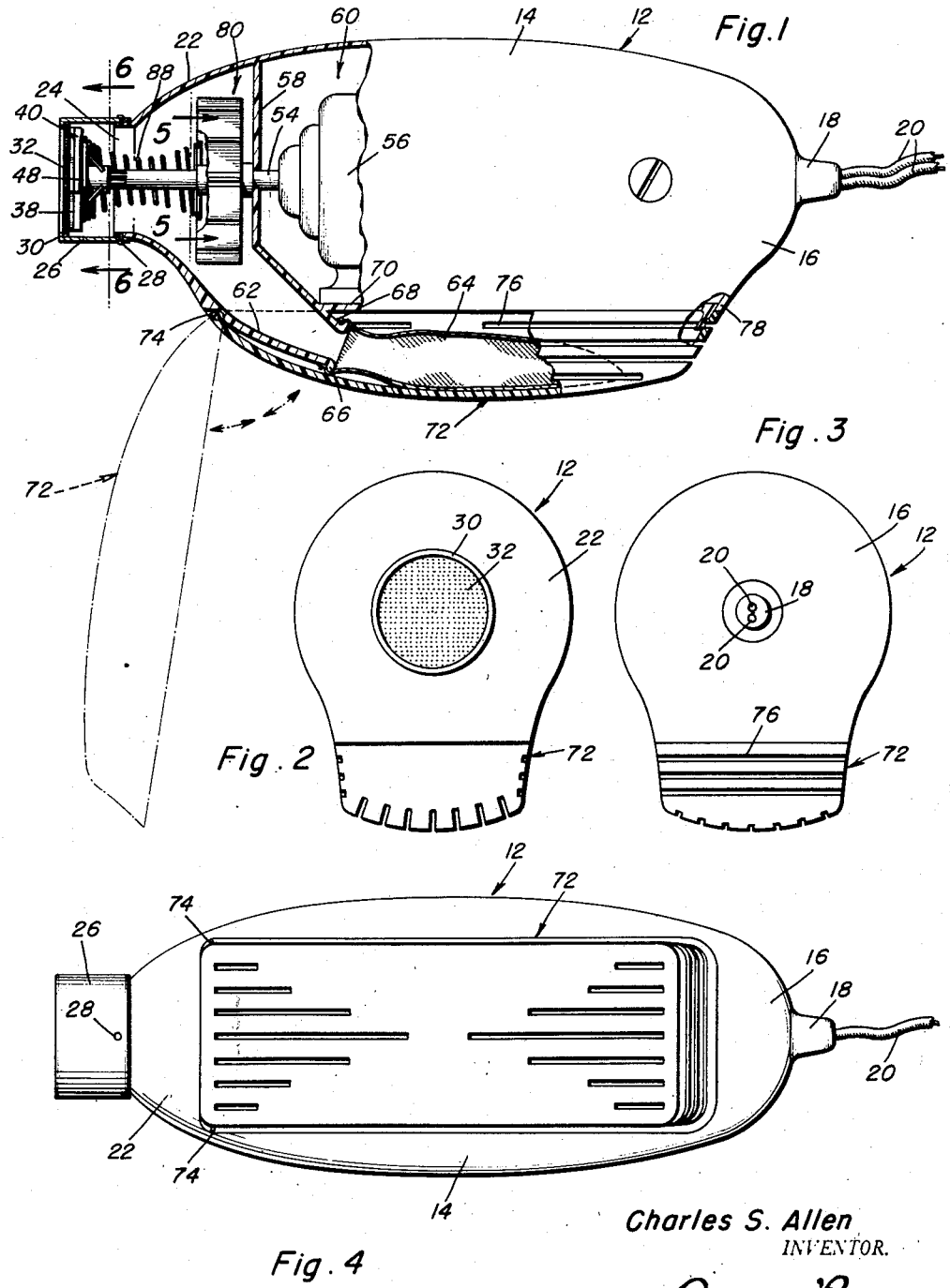
Figure 1 is a side elevation, with parts in section, of an electric razor constructed in accordance with the principles of the present invention.
Figure 2 is a front end elevation.
Figure 3 is a rear end elevation.
Figure 4 is a bottom plan view.

Referring now to the drawings with the aid of reference numerals the hollow plastic or equivalent case or casing is denoted by the numeral 12, the body portion being denoted at 14 and this having what may be called a trailing end 16 with an extension 18 to accommodate the electric wires 20. The leading end at the left in Fig. 1 is gradually reduced in cross-section as at 22 and terminates in an annular neck 24. The cap comprises a collar 26 which is secured by pins or the like 28 to the neck and projects axially and terminates in an inturned flange 30 which overlaps the edge portion of the exterior surface of the shear plate 32. This shear plate has a multiplicity of holes or apertures therein and these, as already stated, are preferably rows of triangular holes 34. The interior and exterior surfaces of the plate are perfectly flat to accommodate the self-sharpening cutter blades 36 and 38. These are mounted in channel-shaped holders 40 which are in spaced parallelism and circumferentially spaced and coplanar. The inner end portions overlap and are welded as at 42 to the central sleeve 44 which has grooves or keyways extending through a bore as at 46. The cutter head has been described as a sort of a spider and it includes an endless rigid ring 48 having circumferentially spaced diagonal braces 50 connected to the ring and also with the hub or sleeve. The over-all head is denoted as a unit by the numeral 52. It is obviously splined or keyed removably on the motor shaft 54 which shaft is driven by the electric motor 56. It will be seen in Fig. 1 that there is a partition 58 provided and this defines a motor chamber 60 in which the motor is confined. Cooperating with the casing and partition there is a radial funnel-like member which traps the hairs and delivers them into a collection sack or bag 64. The bag has its mouth fitted over a bead 66 on the funnel and secured by a rubber band or the like 68. The bottom of the motor housing is denoted at 70. The bottom is substantially flat and cooperates with a receptacle-like cover 72 which is hinged in place at one end as at 74 and which has a plurality of slots or vents 76. The free end portion snaps and is held in place by any suitable retaining means (not detailed) but generally indicated at 78. The bag is fitted therein and is extensible by opening and closing the cover as is evident.

Attention is now directed to the bladed suction fan and this is denoted by the numeral 80 and it is keyed as at 82 (Fig. 5) on the shaft 54, the blades being obliquely twisted and connected with a hub 84. The blades are provided on corresponding edges with an end-pressed ring 86 and a coil spring 88 has one end attached to this ring and the other end bearing against the ring 48 of the cutter head 52.

The suction fan serves to draw the hairs into position relative to the cutting surface. This I may explain, in that the hairs actually grow from the center of cups (Fig. 9) in the skin surface. It does not take much suction to draw these cups up to a taut level position. Hence, as the razor passes over the skin surfaces, these cupped portions return to normal, actually cutting the beard below the surface.

Although it may seen that the cutting surface of one inch round is small, it really rides over more surface more quickly than most types of razors.

As explained, this razor is equipped with a hinged lid or cover 72 which holds a small filter paper bag 64. This bag is easily detached and replaced and is under the wall 70 on which the motor rests. The snap-on cover is vented. This plate constitutes the bottom portion of the razor. The vacuum keeps the interior clean at all times and need only periodic changing of the disposable paper sack.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. An electric razor comprising an electric motor having a power delivering shaft, a casing completely enclosing said motor and shaft and fashioned to serve as a handle, said casing having a reduced leading end portion including a neck, a cap cooperatively mounted on said neck, a flat-faced discoidal shear plate removably fitted in said cap, said plate having a multiplicity of apertures therein through and beyond which the face hairs are intended to project for severance, a spring-pressed cutter head removably keyed on said shaft for rotation with the shaft, and self-sharpening radially disposed cutter blades carried by said head and having wiping and shearing contact with the interior surface of said plate, a partition in said casing defining a compartment, said motor being confined and housed in said compartment, said shaft extending through and forwardly beyond said partition and cooperating with the leading end of the casing and capped neck and defining a cutter head operating and hair trapping space, a funnel-like member extending radially from and communicating with said space and serving to collect the hairs trapped in said space, a collection bag detachably mounted on the discharge end of said funnel-like member, a pan-like cover hingedly mounted on said casing and cooperating with the bottom of the casing and constituting a receiver and holder for said bag, and a suction fan keyed on said shaft and located in said space and cooperating with said funnel-like member.

2. An electric razor comprising an electric motor having a power delivering shaft, a casing completely enclosing said motor and shaft and fashioned to serve as a handle, said casing having a gradually reduced leading end portion, a partition fixed in said casing and separating the motor from said leading end portion, said leading end portion terminating in a neck, a cap mounted on said neck, a shear plate removably mounted within the confines of said cap, a spring-pressed cutter head having cutter blades in operative wiping contact with the adjacent interior surface of said shear plate, a suction fan keyed for rotation on said shaft forwardly of said partition, a hair trapping and discharging funnel, a collection bag detachably mounted on the discharge end of said funnel, and a pan-like cover hingedly mounted at one end on the bottom of said casing and having its other end releasably connected with a cooperating rear end portion of said casing, said cover constituting an adaptable receiver and holder for said bag and having ventilating slots.

References Cited in the file of this patent
UNITED STATES PATENTS

| | | |
|---|---|---|
| 2,130,311 | Parham | Sept. 13, 1938 |
| 2,341,833 | Volz | Feb. 15, 1944 |
| 2,376,197 | Schlotthaver | May 15, 1945 |
| 2,388,324 | Holcomb | Nov. 6, 1945 |